(12) United States Patent
Lee (10) Patent No.: US 9,865,891 B2
(45) Date of Patent: Jan. 9, 2018

(54) SYSTEM AND METHOD FOR DIAGNOSING STATE OF COOLING WATER

(71) Applicant: Hyundai Motor Company, Seoul (KR)

(72) Inventor: Dong Hun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 100 days.

(21) Appl. No.: 15/146,475

(22) Filed: May 4, 2016

(65) Prior Publication Data

US 2017/0117563 A1    Apr. 27, 2017

(30) Foreign Application Priority Data

Oct. 23, 2015 (KR) .................. 10-2015-0147674

(51) Int. Cl.
| | |
|---|---|
| *G01N 1/14* | (2006.01) |
| *F04B 51/00* | (2006.01) |
| *H01M 8/00* | (2016.01) |
| *H01M 8/0438* | (2016.01) |
| *H01M 8/0432* | (2016.01) |
| *H01M 8/04664* | (2016.01) |

(52) U.S. Cl.
CPC ......... *H01M 8/04425* (2013.01); *F04B 51/00* (2013.01); *H01M 8/04358* (2013.01); *H01M 8/04373* (2013.01); *H01M 8/04417* (2013.01); *H01M 8/04664* (2013.01)

(58) Field of Classification Search
None
See application file for complete search history.

(56) References Cited

U.S. PATENT DOCUMENTS

| | | | | |
|---|---|---|---|---|
| 6,668,766 | B1 * | 12/2003 | Liederman | F01P 5/12 123/198 C |
| 6,758,172 | B2 * | 7/2004 | Morgan | F01P 7/048 123/41.08 |
| 8,224,517 | B2 * | 7/2012 | Eser | F01P 5/14 123/41.01 |

(Continued)

FOREIGN PATENT DOCUMENTS

| | | |
|---|---|---|
| JP | 2013-068267 A | 4/2013 |
| KR | 10-2011-0107975 | 10/2011 |

(Continued)

*Primary Examiner* — Peter Macchiarolo
*Assistant Examiner* — Jermaine Jenkins
(74) *Attorney, Agent, or Firm* — Mintz Levin Cohn Ferris Glovsky and Popeo, P.C.; Peter F. Corless (57) ABSTRACT

A system for diagnosing a cooling water state applied to a cooling water pump control system is provided. The cooling water pump control system includes a speed controller that generates an output current instruction value of an inverter to provide power to a cooling water pump based on a difference between a speed instruction value of the cooling water pump and an actual speed measurement value of the cooling water pump. The system for diagnosing a cooling water state includes a pump speed prediction model unit that generates a speed estimation value to predict a speed of the cooling water pump based on the output current instruction value, and a pump state diagnosing unit that compares the speed estimation value and the actual speed measurement value to diagnose a circulation state of the cooling water.

12 Claims, 9 Drawing Sheets

(56) References Cited

U.S. PATENT DOCUMENTS

| | | | |
|---|---|---|---|
| 8,813,692 B2* | 8/2014 | Bialas | F01P 7/167 123/41.01 |
| 9,086,026 B2* | 7/2015 | Levijoki | F02D 41/04 |
| 9,228,482 B2* | 1/2016 | Levijoki | F04B 49/02 |
| 2015/0219104 A1* | 8/2015 | Lee | F04D 13/06 417/42 |
| 2015/0267708 A1* | 9/2015 | Masuda | B60K 6/485 417/45 |
| 2015/0343892 A1* | 12/2015 | Kolhouse | B60K 11/085 165/287 |
| 2016/0159247 A1* | 6/2016 | Lee | B60L 11/1892 429/437 |
| 2016/0186645 A1* | 6/2016 | Rollinger | F01P 7/16 701/102 |
| 2016/0369720 A1* | 12/2016 | Ohsara | F02D 41/0007 |

FOREIGN PATENT DOCUMENTS

| | | |
|---|---|---|
| KR | 10-2013-01291286 | 11/2013 |
| KR | 10-1361408 B1 | 2/2014 |
| KR | 10-1535009 | 7/2015 |

* cited by examiner

SYSTEM AND METHOD FOR DIAGNOSING STATE OF COOLING WATER

CROSS REFERENCE TO RELATED APPLICATION

The present application claims priority to Korean Patent Application No. 10-2015-0147674, filed Oct. 23, 2015, the entire contents of which is incorporated herein for all purposes by this reference.

BACKGROUND

1. Field of the Invention

The present invention relates to a system and method for diagnosing a state of cooling water, and more particularly, to a system and method for diagnosing a state of cooling water capable of determining a state of plumbing with application of load model of the cooling water plumbing even under a condition that a cooling water pump speed changes.

2. Description of the Related Art

A fuel cell system mounted in a fuel cell vehicle is configured with a hydrogen supply system that supplies hydrogen to a fuel cell stack; an air supply system that supplies oxygen, which is an oxidizing agent necessary for an electrochemical reaction, in the air to the fuel cell stack; the fuel cell stack that generates electricity based on the electrochemical reaction of the hydrogen and oxygen; and a heat and water management system that removes an electrochemical reaction heat from the fuel cell stack and simultaneously, adjusts temperature of the fuel cell stack.

The heat and water management system includes a cooling water pump that circulates cooling water to the fuel cell stack, and a radiator that cools the cooling water discharged from the fuel cell stack after cooling, and also includes an ion filter that filters ions flowing out from a cooling loop. An atmospheric pressure cap is mounted on the top end of the radiator of the heat and water management system, a reservoir is provided in an atmospheric structure, and a water level sensor is mounted in the inner side. A predetermined package space is necessary for mounting the water level sensor for the cooling water in the reservoir, but it may be difficult to secure the package space. In addition, even when the water level sensor is mounted therein, when the cooling water is mixed with the air and circulated, the water level sensor is not capable of detecting a loss of the cooling water and may continuously perceives the water level as normal.

In other words, a cooling water shortage phenomenon may be determined through the water level sensor or a pressure sensor installed in the plumbing, but such a method frequently results in misdetection by the sensor due to an influence of disturbances such as a temperature change in cooling water, a cooling loop change due to opening or closing of a cooling line valve, or vibration of a vehicle or equipment, etc. Accordingly, a flow rate sensor may be mounted in the cooling water plumbing. However, the mounting of the flow rate sensor may be complex, since the sensor is expensive and it is not convenient to install separate plumbing to mount the sensor therein.

In order to address limitations in the cooling water determination method as the above-described sensor manner, the applicant of the present invention has proposed a technique for determining whether the cooling water is normally circulated through an analysis of torque (i.e. current) or an output of the cooling water pump. However, the related art also enables the determination for the normal circulation of the cooling water only in a normal state period in which a cooling water pump speed is constant. In an actual system, since the cooling water pump speed is variably controlled in real time based on a heat amount, there is a limitation in determination of the cooling water state only with determination of normal circulation of the cooling water at a fixed speed.

The matters described as the background arts are merely intended to increase the understanding of the background of the present invention, and should not be recognized as being prior arts which are already known to those skilled in the art.

SUMMARY

Accordingly, the present invention provides a system and method for diagnosing a state of cooling water capable of determining a state of cooling water plumbing with an application of a load model of cooling water plumbing without using a separate sensor under a condition that a cooling water pump speed changes.

In order to accomplish the above object, the present invention provides a system for diagnosing a cooling water state applied to a cooling water pump control system. The cooling water pump control system may include a speed controller configured to generate an output current instruction value of an inverter to provide power to a cooling water pump based on a difference between a speed instruction value of the cooling water pump and an actual speed measurement value of the cooling water pump. The system for diagnosing a cooling water state may include: a pump speed prediction model unit configured to generate a speed estimation value to predict a speed of the cooling water pump based on the output current instruction value; and a pump state diagnosing unit configured to compare the speed estimation value and the actual speed measurement value to diagnose a circulation state of the cooling water.

In an exemplary embodiment, the pump state diagnosing unit may be configured to determine the circulation state of the cooling water as abnormal, when a ratio of the speed estimation value over the actual speed measurement value of the cooling pump is less than a preset reference value for normal circulation determination. In addition, the pump state diagnosing unit may be configured to determine the circulation state of the cooling water as abnormal, when a state, in which a ratio of the speed estimation value over the actual speed measurement value of the cooling pump is less than a preset reference value for normal circulation determination, is continued in excess of a preset period of time.

Further, the pump state diagnosing unit may be configured to calculate a ratio of the speed estimation value over the actual speed measurement value of the cooling pump a plurality of times for a preset period, calculate a mean value of the plurality of ratios calculated for the preset period, and determine the circulation state of the cooling water as abnormal, when the mean value is less than a preset reference value for normal circulation determination. The pump state diagnosing unit may also be configured to calculate a ratio of the speed estimation value over the actual speed measurement value of the cooling pump a plurality of times for a preset period, calculate a mean value of the plurality of ratios calculated for the preset period, and determine the circulation state of the cooling water as abnormal, when a state, in which the mean value is less than the preset reference value of normal circulation determination, is continued in excess of a preset period of time.

In order to accomplish the above object, the present invention provides a system for diagnosing a cooling water state applied to a cooling water pump control system, whereby the cooling water pump control system may include a speed controller configured to generate an output current instruction value of an inverter to provide power to a cooling water pump based on a difference between a speed instruction value of the cooling water pump and an actual speed measurement value of the cooling water pump. The system for diagnosing a cooling water state may include: a speed controller model unit modeling the speed controller to generate a current instruction estimation value to predict an output current of the inverter based on a difference between the speed instruction value and a speed estimation value to predict a speed of the cooling water pump; a pump speed prediction model unit configured to generate the speed estimation value based on the current instruction estimation value; and a pump state diagnosing unit configured to compare the current instruction estimation value and the output current instruction value to diagnose a circulation state of the cooling water.

In an exemplary embodiment, the pump state diagnosing unit may be configured to determine the circulation state of the cooling water as abnormal, when a ratio of the output current instruction value over the current instruction estimation value is less than a preset reference value for normal circulation determination. In addition, the pump state diagnosing unit may be configured to determine the circulation state of the cooling water as abnormal, when a state, in which a ratio of the output current instruction value over the current instruction estimation value is less than a preset reference value for normal circulation determination, is continued in excess of a preset period of time.

Further, the pump state diagnosing unit may be configured to calculate a ratio of the output current instruction value over the current instruction estimation value a plurality of times for a preset period, calculate a mean value of the plurality of ratios calculated for the preset period, and determine the circulation state of the cooling water as abnormal, when the mean value is less than a preset reference value for normal circulation determination. In addition, the pump state diagnosing unit may be configured to calculate a ratio of the output current instruction value over the current instruction estimation value a plurality of times for a preset period, calculate a mean value of the plurality of ratios calculated for the preset period, and determine the circulation state of the cooling water as abnormal, when a state, in which the mean value is less than a preset reference value for normal circulation determination, is continued in excess of a preset period of time.

In order to accomplish the above object, the present invention provides a method for diagnosing a cooling water state applied to a cooling water pump control system, whereby the cooling water pump control system may include a speed controller configured to generate an output current instruction value of an inverter to provide power to a cooling water pump based on a difference between a speed instruction value of the cooling water pump and an actual speed measurement value of the cooling water pump. The method may include: generating, by a pump speed prediction model unit, a speed estimation value to predict a speed of the cooling water pump according to the output current instruction value; calculating, by a pump state diagnosing unit, a ratio of the speed estimation value over an actual speed measurement value of the cooling water pump a plurality of times; calculating a mean value of the plurality of ratios calculated by the pump state diagnosing unit; and determining a circulation state of the cooling water as abnormal when a state, in which the mean value is less than a preset reference value for normal circulation determination, continues in excess of a preset period of time.

In order to accomplish the above object, the present invention provides a method for diagnosing a cooling water state applied to a cooling water pump control system, whereby the cooling water pump control system may include a speed controller configured to generate an output current instruction value of an inverter to provide power to a cooling water pump based on a difference between a speed instruction value of the cooling water pump and an actual speed measurement value of the cooling water pump.

Particularly, the method may include: generating, by a speed controller model unit modeling the speed controller, a current instruction estimation value to predict an output current of the inverter based on a difference between the speed instruction value and a speed estimation value to predict a speed of the cooling pump; generating, by a pump speed prediction model unit, the speed estimation value based on the current instruction estimation value; calculating, by a pump state diagnosing unit, a ratio of the output current instruction value over the current instruction estimation value a plurality of times for a preset period; calculating a mean value of the plurality of ratios calculated by the pump state diagnosing unit; and determining, by the pump state diagnosing unit, a circulation state of the cooling water as abnormal, when a state, in which the mean value is less than a preset reference value for normal circulation determination, is continued in excess of a preset period of time.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the attached drawings. Reference now should be made to the drawings, in which the same reference numerals are used throughout the different drawings to designate the same or similar components.

Figure 1A:
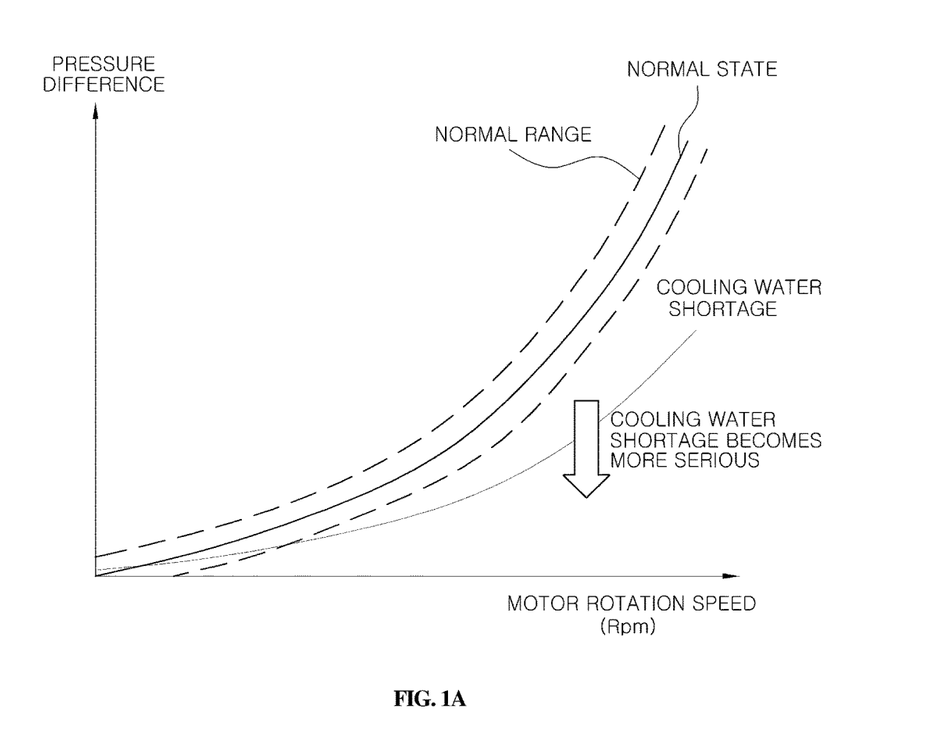
FIGS. 1A to 1C are graphs illustrating relationships between a pressure difference of inlet and outlet ends of a cooling water pump, a flow rate of cooling water, and an output or a torque of a motor according to a rotation speed of a cooling water motor according to an exemplary embodiment of the present invention.
Figure 1B:
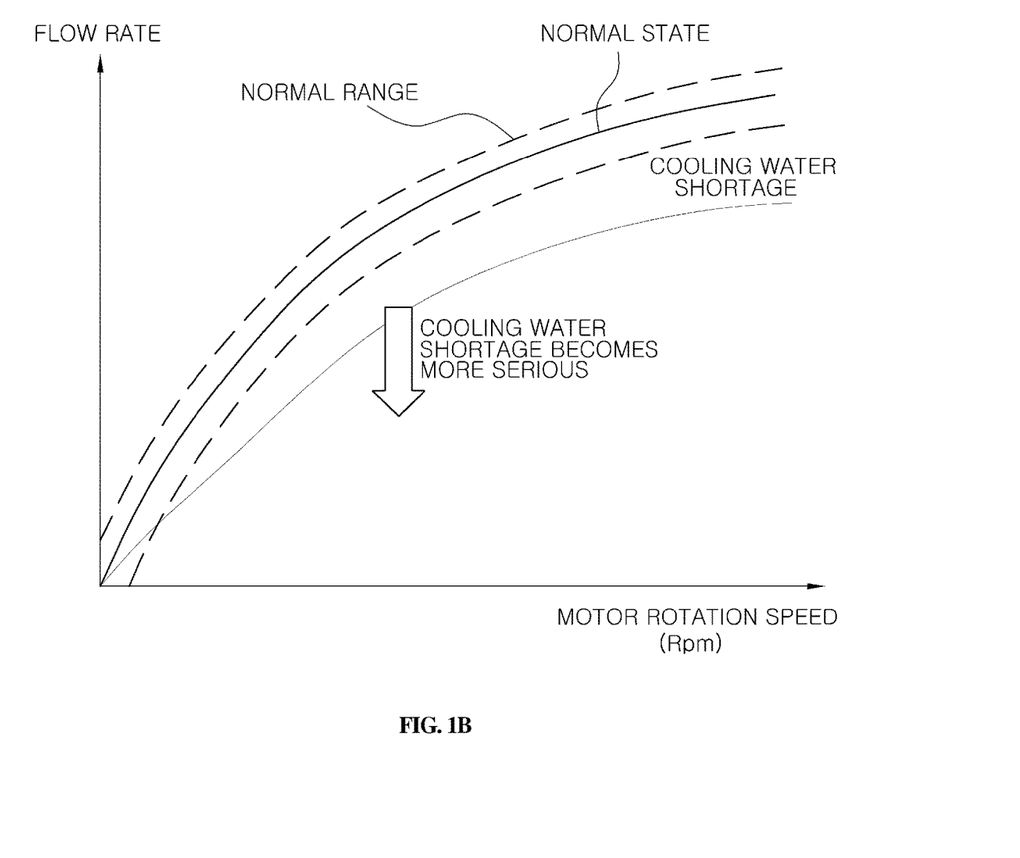
Figure 1C:
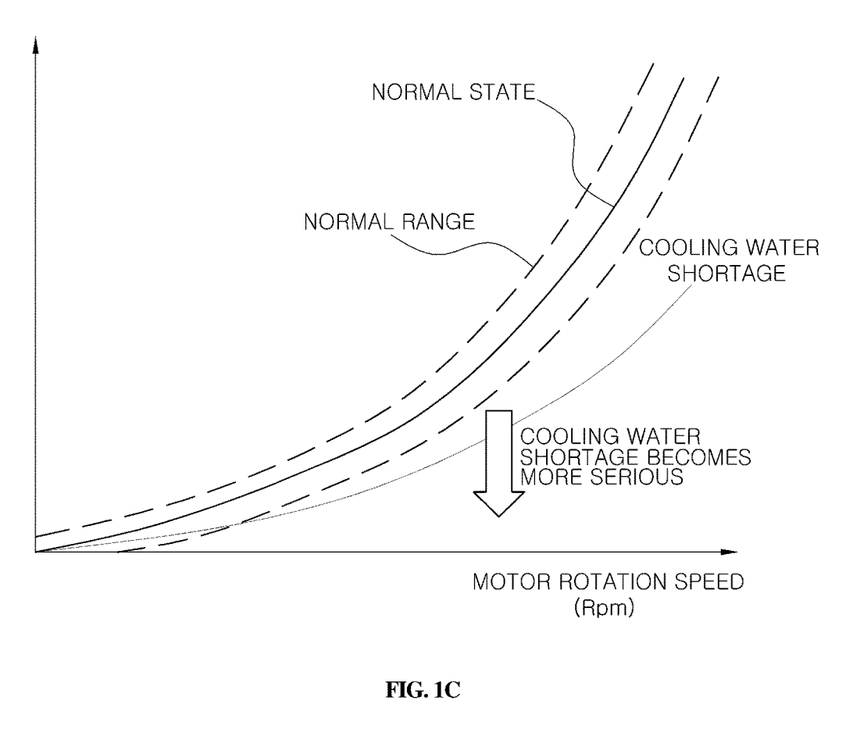

FIGS. 1A to 1C are graphs illustrating relationships between a pressure difference of inlet and outlet ends of a cooling water pump, a flow rate of cooling water, and an output or a torque of a motor according to a rotation speed of a cooling water motor. Referring to FIGS. 1A to 1C, when cooling water is normally circulated in a cooling system without shortage of the cooling water, a pressure difference between inlet and outlet ends of the cooling water pump and a flow rate of the cooling water are within normal ranges of normal state values, and a torque necessary for driving the cooling pump at a constant speed is within a particular range of the normal state value. However, when there is a shortage of cooling water or the cooling water plumbing is blocked preventing the cooling water from normally circulating or circulating abnormally, the pressure difference between the pump inlet and outlet, and the pump flow rate may decrease. In addition, the pump output (e.g., torque or current), required based on the pump speed in the pump motor, may also be decreased compared to the normal state. As the cooling water shortage increases, amounts of reduction in the pressure difference and the pump flow rate further increase.

Figure 2:
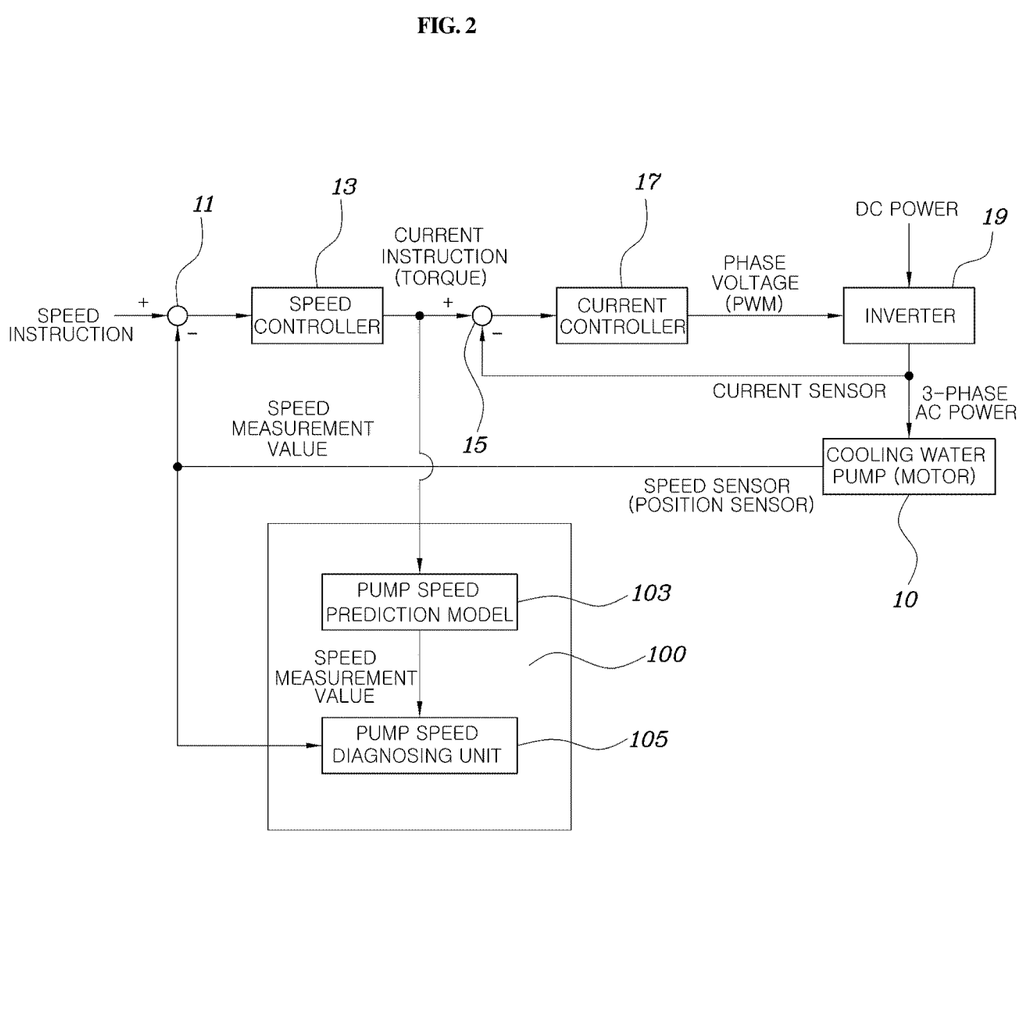
FIG. 2 is a block configuration diagram of a system for diagnosing a cooling water state according to an exemplary embodiment of the present invention.

FIG. 2 is a block configuration diagram of a system for diagnosing a cooling water state according to an exemplary embodiment of the present invention. Referring to FIG. 2, a system for diagnosing a cooling water state according to an exemplary embodiment of the present invention may be applied to a cooling water pump control system that may include a speed controller 13 configured to generate an output current instruction value of an inverter 19, which adjusts a rotation speed of a cooling water pump 10 based on a difference between a speed instruction value, input from the outside, for the cooling water pump 10 and an actual rotation speed detection value of the cooling water pump 10.

The output current instruction value output from the speed controller 13 is an instruction value for determining an output current of the inverter 19, which provides a 3-phase alternating current (AC) power to the cooling pump 10. The output current instruction value may be converted into a value for determining a torque of the cooling pump 10 and the current instruction value may be converted into a torque instruction value. The output current instruction value may be compared with a detected value of the output current of the inverter 19 and the comparison result may be input to the current controller 17. The current controller 17 may be configured to determine a voltage instruction of each phase of the inverter 10 to match the current instruction value with the actually detected output current of the inverter 19, and may be configured to input the voltage instructions to the inverter 19.

In FIG. 2, a reference numeral '11' refers to a subtractor configured to compare the output of a speed instruction value with an actual rotation speed measurement value of the cooling pump to output a value that corresponds to a difference therebetween, and a reference numeral '15' refers to a subtractor configured to compare the output current instruction value with an actually detected output current value of the inverter 19 to output a value that corresponds to a difference therebetween. In addition, the actual rotation speed of the cooling pump may be detected by a rotation speed detection sensor (e.g. a position sensor), which is well known in the art, and the actual output current of the inverter 19 may also be detected using a current sensor, which is also well known in the art.

An exemplary embodiment of the present invention may be applied to the cooling water pump speed control system configured as described above, and may include a pump speed prediction model unit 103 and a pump state diagnosing unit 105. The pump speed prediction model unit 103 and the pump state diagnosing unit 105 may be provided in a controller 100 configured to operate the cooling water pump, and the controller 100 may include a processor configured to apply a preset algorithm to a specific input value to generate a desired output value. The pump speed prediction model unit 103 may be configured to receive the output current instruction value of the inverter 19, which is output from the speed controller 13, and calculate a pump speed estimation value based on the received output current instruction value.

Figure 3:
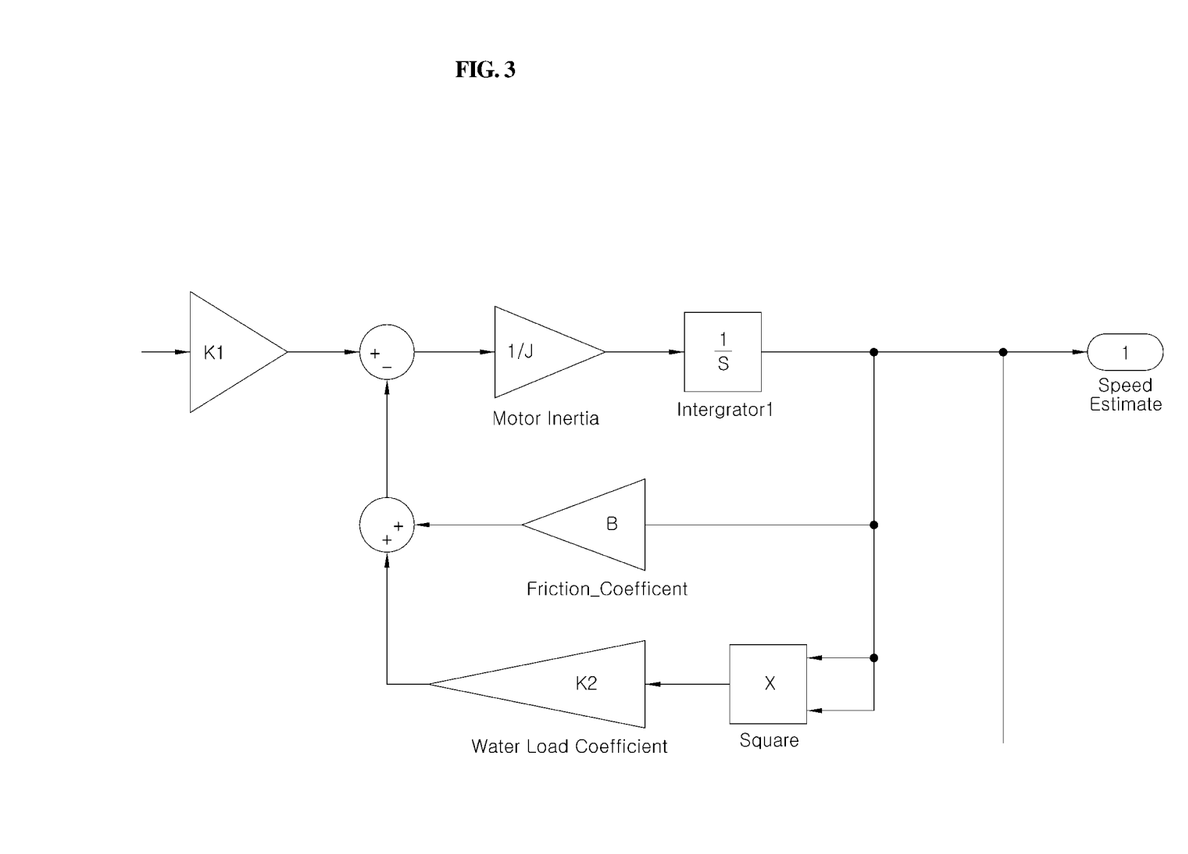
FIG. 3 is a control configuration diagram illustrating an exemplary pump speed prediction model of the system illustrated in FIG. 2 according to an exemplary embodiment of the present invention.

FIG. 3 is a control configuration diagram illustrating an exemplary pump speed prediction model of the system illustrated in FIG. 2. In particular, the pump speed prediction model illustrated in FIG. 3 illustrates an exemplary model derived by the following Equation (1) which is a relational equation of a pump and a pump plumbing load.

$$T_q = J\ddot{\theta} + B\dot{\theta} + K_2\dot{\theta}^2 \quad (1)$$

wherein $T_q$ denotes a pump motor torque, J denotes an inertial momentum of pump rotation, B denotes a pump rotation friction coefficient, $K_2$ denotes a plumbing resistance coefficient, $\ddot{\theta}$ denotes a pump rotational acceleration, and $\dot{\theta}$ denotes a pump rotational speed.

Equation (1) is mainly applied in a general pump and compressor load model, in which $T_q$ denotes a torque generated in the pump by a motor, $J\ddot{\theta}$ denotes a force used for accelerating and decelerating the pump, $B\dot{\theta}$ denotes a friction force generated by pump rotation, and $K_{2\dot{\theta}}{}^2$ denotes resistance (i.e. resistance generated by a flow rate and pressure) of hydraulic unit. Equation (1) exemplifies a pump load model typically used in the art, and a method other than Equation (1) may be applied. In addition, since constants in Equation (1) are pump design parameters, the constants may be determined using design data and extracted using a pump driving test. In other words, various types of pump parameters J, N, and $K_2$ applied to the pump speed prediction model unit 103 may be determined as values tuned in an experimental manner based on a condition that the cooling water is normally circulated.

According to Equation (1), a control configuration diagram for calculating the pump rotational speed $\dot{\theta}$ may be realized as illustrated in FIG. 3. In other words, the pump speed prediction model unit 13 applied to an exemplary embodiment of the present invention may be realized as the control configuration as illustrated in FIG. 3, and the pump speed prediction model unit 13 may be configured to generate a rotational speed estimation value of the cooling pump 10 based on the output current instruction value output from the speed controller 13. The pump state diagnosing unit 105 may be configured to diagnose the cooling water state based on a result of comparing the rotational speed estimation value generated by the pump speed prediction model unit 13 and an actual rotational speed of the cooling water pump 10 detected in the cooling water pump 10.

Figure 4:
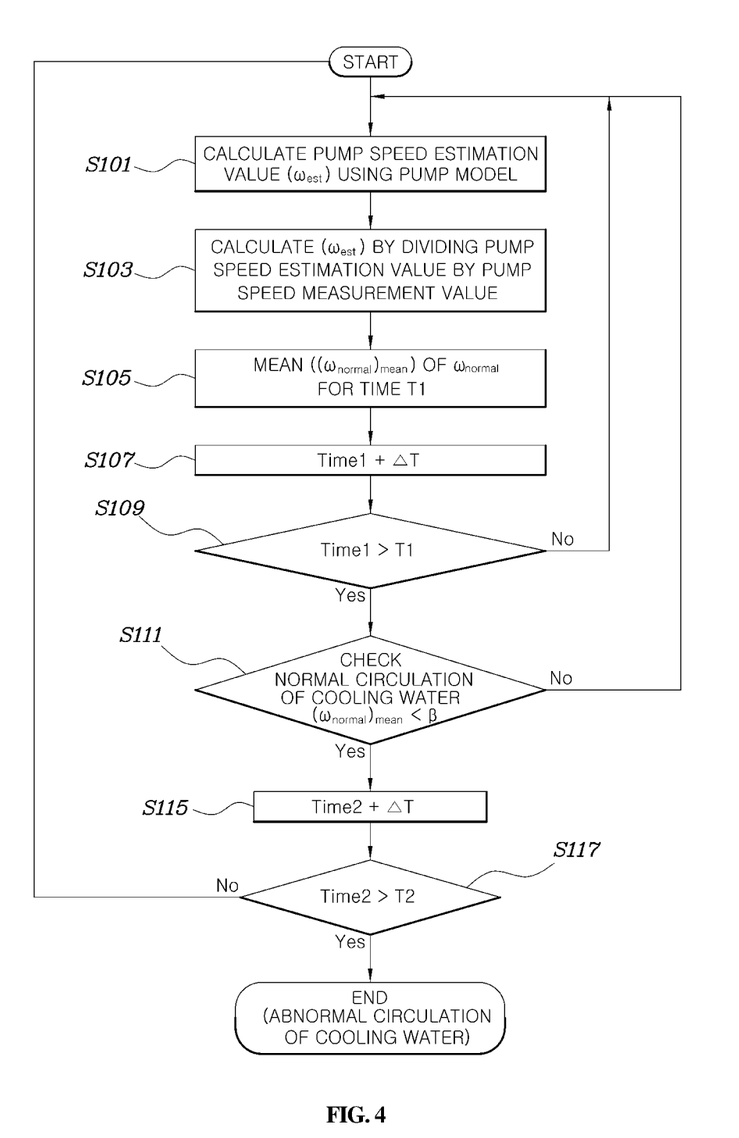
FIG. 4 is a flowchart illustrating a method for diagnosing a cooling water state, which is realized in the system illustrated in FIG. 2, according to an exemplary embodiment of the present invention.

FIG. 4 is a flowchart illustrating a method for diagnosing a cooling water state, which is realized in the system illustrated in FIG. 2, according to an exemplary embodiment of the present invention. Through a description about FIG. 4, an effect of a cooling water state diagnosis system according to an exemplary embodiment of the present invention will be more clearly understood. Firstly, the pump speed prediction unit 103 may be configured to receive the output current instruction value output from the speed controller 13 and generate the rotational speed estimation value of the cooling water pump 10 based on the output current instruction value (operation S101).

As described above, the speed controller 13 may be configured to generate the output current instruction value for a feedback control based on a speed instruction value input from the outside and an actual speed measurement value detected in the cooling water pump 10. In addition, the pump speed prediction model unit 103 as exemplified on FIG. 3 may be configured to predict a rotation speed of a cooling water pump 10 based on the output current instruction value through a preset modeling control configuration. The rotation speed of the predicted cooling water pump 10 may become a rotation speed estimation value.

Further, the pump state diagnosing unit 105 may be configured to determine a cooling water state based on the rotation speed estimation value generated by the pump speed prediction model unit 103 and an actual rotation speed of the cooling water pump 10. Particularly, the pump state diagnosing unit 105 may be configured to determine the cooling water state to be abnormal, when a difference between the rotation speed estimation value and the actual rotation speed is greater than a preset reference.

In an example illustrated in FIG. 4, a ratio of the rotation speed estimation value over the actual rotation speed (i.e. rotation speed estimation value/actual rotation speed) is used for a type of normalization to compare a difference between the rotation speed estimation value and the actual rotation speed, and the ratio may be calculated a plurality of times (e.g., multiple times) during a preset period of time and a mean value thereof may be compared with a reference value of normal circulation determination to determine whether the cooling water state is normal. In addition, when a period of time, determined as abnormal based on the comparison result of the mean value with the reference value for determining the normal circulation, is greater than the preset period of time, the cooling water state may be determined to be abnormal.

Particularly, in operation S103, the rotation speed estimation value generated by the pump speed prediction model unit 103 may be divided by the actual rotation speed of the cooling water pump 10 to calculate a ratio $\omega_{normal}$ and in operation S105, a mean value $(\omega_{normal})_{mean}$ of the calculated ratios $\omega_{normal}$ may be calculated for a preset period of time T1. The ratio calculation in operation S104, namely, the normalization may be executed since comparison may be possible through the normalized speed value based on '1' regardless of an absolute magnitude of the speed. Such a normalization process may be omitted, if necessary. In addition, a process for obtaining the mean value in operation S105 may prevent a diagnosis error from occurring due to sudden noise.

In FIG. 4, operations S107 and S109 mean repetition of operations S101 to S103 in a constant period of $\Delta T$ for the time interval of T1. Then, in operation S111, normal circulation of the cooling water may be detected. The detection of the normal circulation of cooling water may be performed by determining whether the mean value of $(\omega_{normal})_{mean}$ of the ratios of $(\omega_{normal})$ calculated for the present time T1 is less than a preset reference value $\beta$ for normal circulation determination.

When the cooling water is not normally circulated (e.g., abnormal circulation), as described in relation to FIGS. 1A to 1C, the pump output may be required to be minimal and the output current instruction value of the speed controller 13 may be calculated to be minimal, and accordingly, a speed estimation value may also be calculated to be minimal Consequently, the mean value $(\omega_{normal})_{mean}$ of the ratios $\omega_{normal}$ decreases. In operation S111, the abnormal circulation state of the cooling water may be determined by using the above-described.

When the mean value of $(\omega_{normal})_{mean}$ of the ratios $\omega_{normal}$ calculated for the present time T1 is less than the preset reference value of $\beta$ for normal circulation determination, the cooling water may be determined to be in the abnormal circulation state and the diagnosis process may be terminated However, in the example of FIG. 4, a process for detecting the normal circulation of the cooling water may be repeated for a preset time T2.

Accordingly, operations S115 and S117 may be provided. In other words, according to the example of FIG. 4, when the state is continued in which the mean value of $(\omega_{normal})_{mean}$ of the ratios of $(\omega_{normal})$ calculated for the preset time T1, in excess of the T2, is less than the preset reference value of $\beta$ for normal circulation determination, the abnormal circulation state of the cooling water may be determined, and otherwise, the determination time may be re-set (operation S113) to restart the entire process. Further, the reference value $\beta$ for normal circulation determination may be less than 1 and may be set in advance as a value for minimizing the diagnosis time without misdiagnosis through an experimental method.

Figure 5:
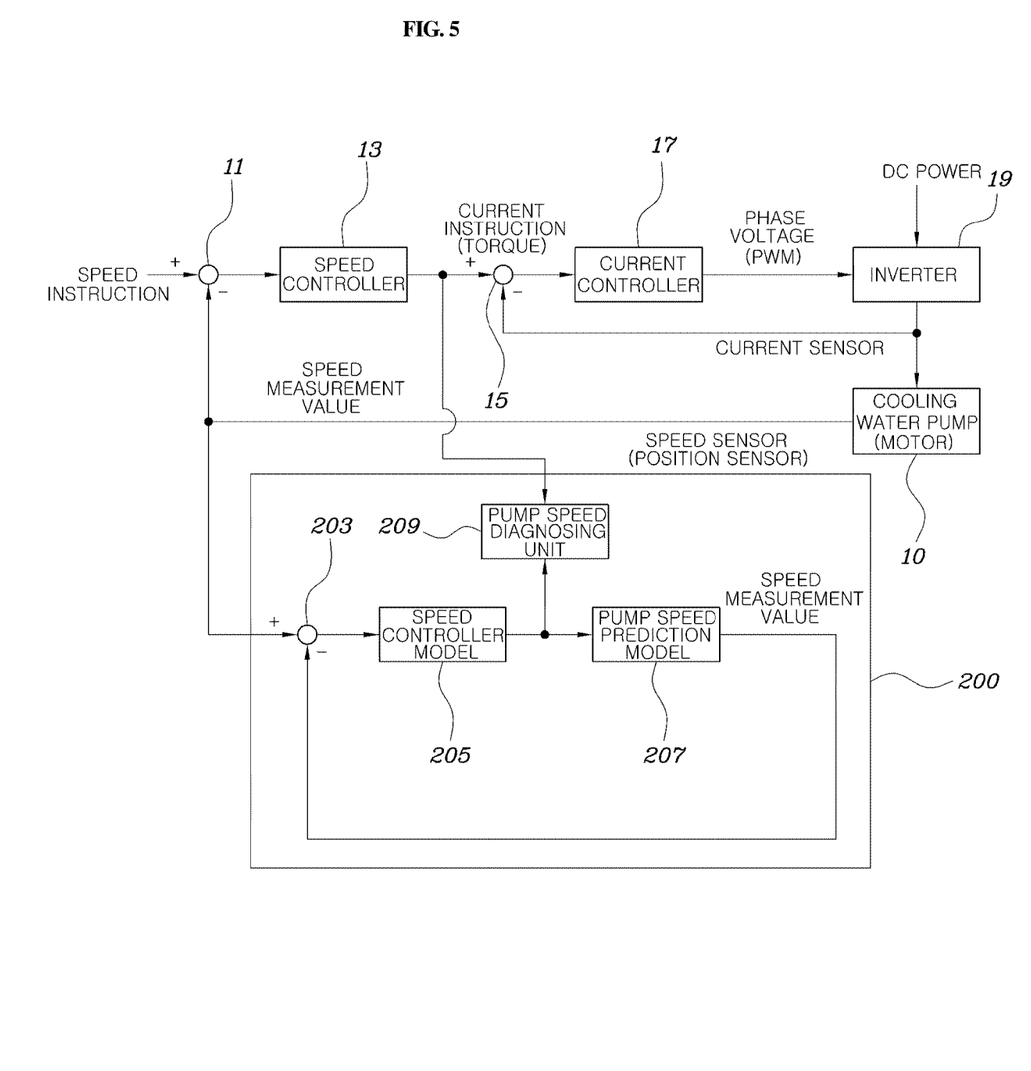
FIG. 5 is a block configuration diagram of a system for diagnosing a cooling water state according to an exemplary embodiment of the present invention.

FIG. 5 is a block configuration diagram of a system for diagnosing a cooling water state according to an exemplary embodiment of the present invention. In an exemplary embodiment illustrated in FIG. 5, the pump speed prediction model unit 207 may be applied as illustrated in the exemplary embodiment illustrated in FIG. 2 and may be different in parameters used for the cooling water state diagnosis. In the exemplary embodiment illustrated in FIG. 5, an estimation value of the current instruction may be generated using the speed controller model unit 205 for modeling the speed controller 13 and the estimation value of the current instruction may be compared with a current instruction value actually output from the speed controller 13 to diagnose the cooling water state.

Referring to FIG. 5, the cooling water state diagnosing system according to an exemplary embodiment of the present invention may include a speed controller model unit 205, a pump speed prediction model unit 207, and a pump state diagnosing unit 209. The speed controller model unit 205 may be used as the speed controller 13 applied to a cooling water pump control system and may be configured to generate a current instruction estimation value based on a difference between a speed instruction value input from the outside and a rotational speed estimation value generated by the pump speed prediction model unit 207.

Figure 6:
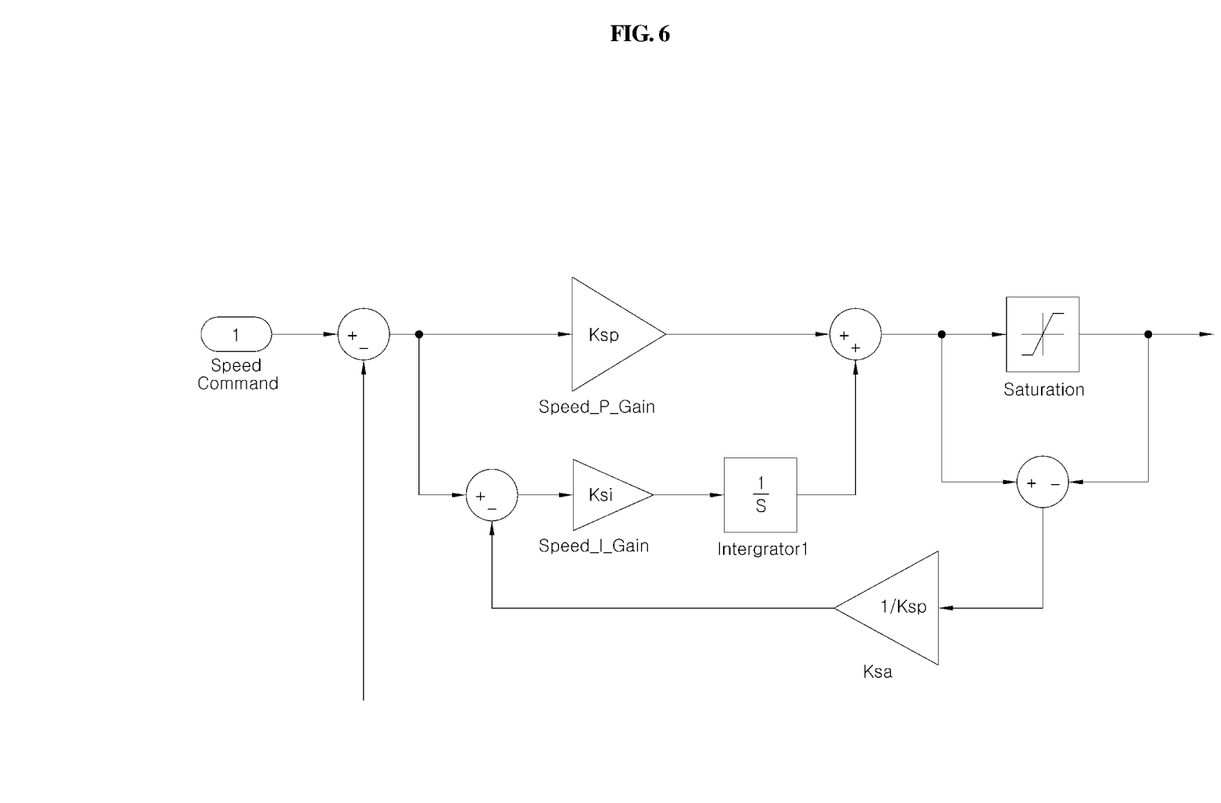
FIG. 6 is a control configuration diagram illustrating an exemplary speed controller model applied to the exemplary embodiment illustrated in FIG. 5.

FIG. 6 is a control configuration diagram illustrating an exemplary speed controller model applied to the exemplary embodiment illustrated in FIG. 5. An exemplary speed controller model unit illustrated in FIG. 6 is a control configuration for modeling a proportional-integral (PI) speed controller, which is substantially identical to the speed controller 13 applied to the cooling water pump control system. When a difference between the cooling pump speed instruction value and the rotational speed estimation value output from the pump speed prediction model unit 207 is input to the speed controller model unit 205, a current instruction value according thereto may be calculated and the calculated value may be referred to as the current instruction estimation value, since it may be calculated by the rotation speed estimation value. The current instruction estimation value may be re-input to the pump speed prediction model unit 207 to calculate the rotation speed estimation value of the cooling water pump.

While the speed estimation value is compared with the actual speed value in the exemplary embodiments described in relation to FIGS. 2 and 4, in the exemplary embodiment of FIG. 5, the current instruction estimation may be compared with the actual current instruction value to diagnose the cooling water circulation state. In addition, as in the exemplary embodiments of FIGS. 1A to 1C, since various pump parameters I, B, and $K_2$ exemplified in Equation (1) are set as values tuned properly to the condition that the cooling water is normally circulated in the pump speed prediction model unit 207, the speed controller model unit 205 may be configured to calculate the current instruction estimation value when the cooling water is normally circulated in real time. Accordingly, while, in normal circulation of the cooling water, an actual current instruction output from the speed controller 13 matches the current instruction estimation value, a rear stage load of the pump may be reduced and the actual current instruction value may decrease as described in relation to FIGS. 1A to 1C, when the cooling water is not normally circulated. According to such a principle, the current instruction estimation value may be compared with the actual current instruction to enable determination for whether the cooling water circulates normally.

Figure 7:
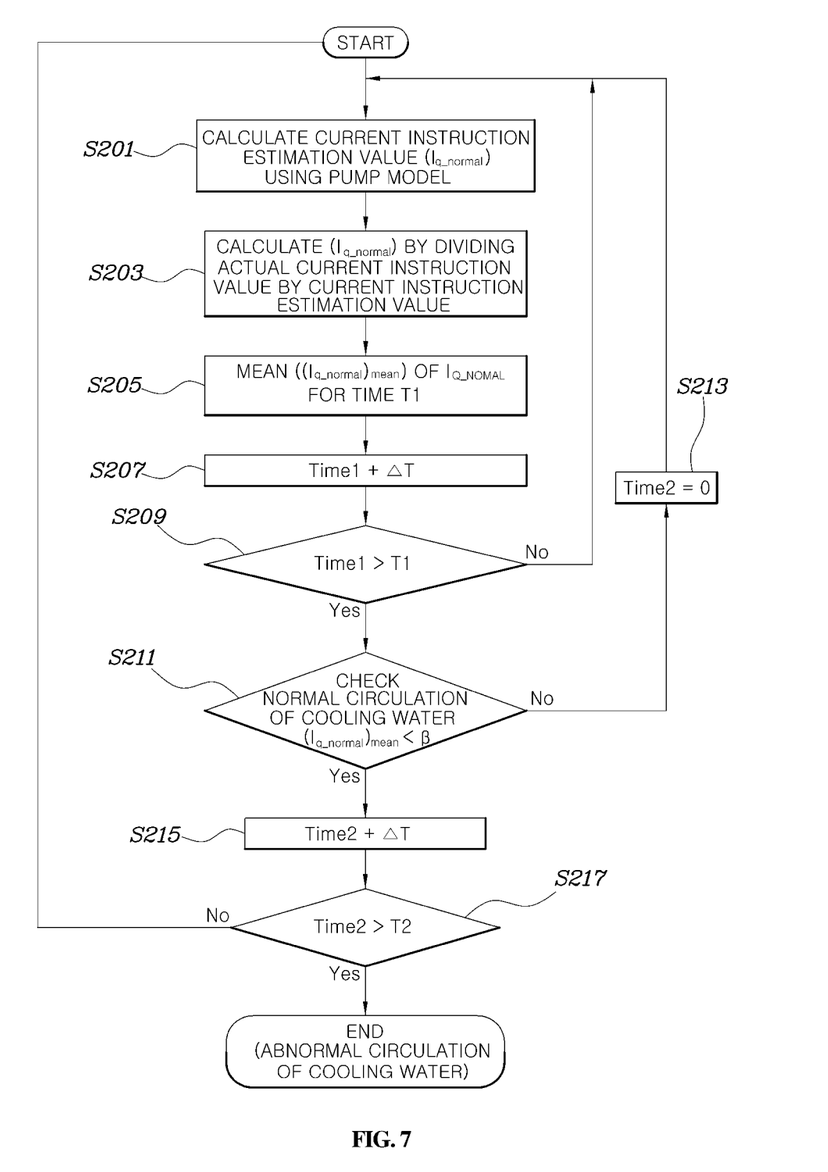
FIG. 7 is a flowchart illustrating a method for diagnosing a cooling water state, which is realized in the system illustrated in FIG. 5, according to an exemplary embodiment of the present invention.

FIG. 7 is a control configuration diagram illustrating an exemplary speed controller model applied to the exemplary embodiment illustrated in FIG. 5. When compared with the exemplary embodiment described in relation to FIG. 4, an exemplary embodiment illustrated in FIG. 7 is substantially identical, excluding that a parameter compared with the preset reference value β for normal circulation determination to diagnose the cooling water circulation state is the current instruction estimation value output from the speed controller model 205 and that the parameter may be normalized with a ratio of the actual output current instruction value output from the speed controller 13 over the current instruction estimation value output from the speed controller model unit 205. Accordingly, even though an additional detailed description regarding FIG. 7 has been omitted, a person skilled in the art may easily practice the exemplary embodiment illustrated in FIG. 7.

As described above, various exemplary embodiments of the present invention may calculate the pump speed estimation value/current instruction estimation value according to the externally input speed instruction using the pump speed prediction model/speed controller model, which is modeled in advance, and compare the pump speed estimation value/current instruction estimation value with the actual current pump speed estimation value/current instruction estimation value to diagnose the cooling water state. Accordingly, various exemplary embodiments of the present invention enable normal circulation diagnosis for the cooling water in a transient period of cooling water pump as well as in the operation period in which the cooling water pump speed is constant. In particular, according to the present invention, since it may be possible to determine the normal circulation of cooling water in the transient period of the cooling water pump speed in real time without a separate test mode, testing time may be reduced and accuracy of the determination of the normal circulation of cooling water may be improved. In addition, various exemplary embodiments of the present invention enable pump output prediction using the preset model unit, when the cooling water circulation is in the normal state in all speed regions.

According to the system and method for diagnosing a cooling water state of the present invention, it may be possible to diagnose normal circulation of the cooling water in a transient period in which a cooling water pump speed changes as well as in a period in which the speed is constant. In particular, according to the present invention, since it may be possible to determine the normal circulation of cooling water in the transient period of the cooling water pump speed in real time without a separate test mode, testing time may be reduced and accuracy of the determination of the normal circulation of cooling water may be improved. In addition, according to the present invention, it may be possible to predict a pump output using a preset model unit when the cooling water is in a normal circulation state in all speed regions.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for diagnosing a cooling water state, comprising:
an inverter configured to provide power to a cooling water pump;
a speed controller configured to generate an output current instruction value of the inverter based on a difference between a speed instruction value of the cooling water pump and an actual speed measurement value of the cooling water pump;

a pump speed prediction model unit configured to generate a speed estimation value to predict a speed of the cooling water pump based on the output current instruction value; and a pump state diagnosing unit configured to compare the speed estimation value and the actual speed measurement value to diagnose a circulation state of the cooling water.

2. The system of claim 1, wherein the pump state diagnosing unit is configured to determine the circulation state of the cooling water as abnormal, when a ratio of the speed estimation value over the actual speed measurement value of the cooling pump is less than a preset reference value for normal circulation determination.

3. The system of claim 1, wherein the pump state diagnosing unit is configured to determine the circulation state of the cooling water as abnormal, when a state, in which a ratio of the speed estimation value over the actual speed measurement value of the cooling pump is less than a preset reference value for normal circulation determination, is continued in excess of a preset period of time.

4. The system of claim 1, wherein the pump state diagnosing unit is configured to calculate a ratio of the speed estimation value over the actual speed measurement value of the cooling pump multiple times for a preset period of time, calculate a mean value of the plurality of ratios calculated for the preset period of time, and determine the circulation state of the cooling water as abnormal, when the mean value is less than a preset reference value for normal circulation determination.

5. The system of claim 1, wherein the pump state diagnosing unit is configured to calculate a ratio of the speed estimation value over the actual speed measurement value of the cooling pump multiple times for a preset period of time, calculate a mean value of the plurality of ratios calculated for the preset period of time, and determine the circulation state of the cooling water as abnormal, when a state, in which the mean value is less than the preset reference value of normal circulation determination, is continued in excess of a preset period of time.

6. A system for diagnosing a cooling water state, comprising:
    an inverter configured to provide power to a cooling water pump;
    a speed controller configured to generate an output current instruction value of the inverter based on a difference between a speed instruction value of the cooling water pump and an actual speed measurement value of the cooling water pump;
    a speed controller model unit configured to generate a current instruction estimation value to predict an output current of the inverter based on a difference between the speed instruction value and a speed estimation value to predict a speed of the cooling water pump;
    a pump speed prediction model unit configured to generate the speed estimation value based on the current instruction estimation value; and
    a pump state diagnosing unit configured to compare the current instruction estimation value and the output current instruction value to diagnose a circulation state of the cooling water.

7. The system of claim 6, wherein the pump state diagnosing unit is configured to determine the circulation state of the cooling water as abnormal, when a ratio of the output current instruction value over the current instruction estimation value is less than a preset reference value for normal circulation determination.

8. The system of claim 6, wherein the pump state diagnosing unit is configured to determine the circulation state of the cooling water as abnormal, when a state, in which a ratio of the output current instruction value over the current instruction estimation value is less than a preset reference value for normal circulation determination, is continued in excess of a preset period of time.

9. The system of claim 6, wherein the pump state diagnosing unit is configured to calculate a ratio of the output current instruction value over the current instruction estimation value multiple times for a preset period of time, calculate a mean value of the plurality of ratios calculated for the preset period of time, and determine the circulation state of the cooling water as abnormal, when the mean value is less than a preset reference value for normal circulation determination.

10. The system of claim 6, wherein the pump state diagnosing unit is configured to calculate a ratio of the output current instruction value over the current instruction estimation value multiple times for a preset period of time, calculate a mean value of the plurality of ratios calculated for the preset period of time, and determine the circulation state of the cooling water as abnormal, when a state, in which the mean value is less than a preset reference value for normal circulation determination, is continued in excess of a preset period of time.

11. A method for diagnosing a cooling water state applied to a cooling water pump control system having an inverter configured to provide power to a cooling water pump and a speed controller configured to generate an output current instruction value of the inverter based on a difference between a speed instruction value of the cooling water pump and an actual speed measurement value of the cooling water pump, the method comprising:
    generating, by a pump speed prediction model unit, a speed estimation value to predict a speed of the cooling water pump based on the output current instruction value;
    calculating, by a pump state diagnosing unit, a ratio of the speed estimation value over an actual speed measurement value of the cooling water pump multiple times;
    calculating, by the pump state diagnosing unit, a mean value of the calculated plurality of ratios; and
    determining, by the pump state diagnosing unit, a circulation state of the cooling water as abnormal when a state, in which the mean value is less than a preset reference value for normal circulation determination, continues in excess of a preset period of time.

12. A method for diagnosing a cooling water state applied to a cooling water pump control system having an inverter configured to provide power to a cooling water pump and a speed controller configured to generate an output current instruction value of the inverter based on a difference between a speed instruction value of the cooling water pump and an actual speed measurement value of the cooling water pump, the method comprising:
    generating, by a speed controller model unit modeling the speed controller, a current instruction estimation value to predict an output current of the inverter based on a difference between the speed instruction value and a speed estimation value to predict a speed of the cooling pump;
    generating, by a pump speed prediction model unit, the speed estimation value based on the current instruction estimation value;

calculating, by a pump state diagnosing unit, a ratio of the output current instruction value over the current instruction estimation value multiple times for a preset period of time;

calculating, by the pump state diagnosing unit, a mean value of the calculated plurality of ratios; and determining, by the pump state diagnosing unit, a circulation state of the cooling water as abnormal, when a state, in which the mean value is less than a preset reference value for normal circulation determination, is continued in excess of a preset period of time.

* * * * *